(12) United States Patent
Sakagami et al.

(10) Patent No.: US 8,970,361 B2
(45) Date of Patent: Mar. 3, 2015

(54) WRONG OPERATION DETECTION DEVICE, METHOD, AND PROGRAM IN TIRE PRESSURE MONITORING SYSTEM

(71) Applicant: Sumitomo Rubber Industries, Ltd., Kobe-shi, Hyogo (JP)

(72) Inventors: Seigou Sakagami, Kobe (JP); Yusuke Fukuba, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 181 days.

(21) Appl. No.: 13/751,475

(22) Filed: Jan. 28, 2013

(65) Prior Publication Data

US 2013/0321138 A1    Dec. 5, 2013

(30) Foreign Application Priority Data

Jun. 4, 2012 (JP) ................................ 2012-126717

(51) Int. Cl.
*B60C 23/00* (2006.01)
*B60C 23/02* (2006.01)
*B60C 23/06* (2006.01)

(52) U.S. Cl.
CPC .............. *B60C 23/02* (2013.01); *B60C 23/061* (2013.01); *B60C 23/062* (2013.01)
USPC .............. 340/442; 340/443; 701/1; 701/29.1; 73/146.2; 73/146

(58) Field of Classification Search
USPC ............................ 340/442, 443; 73/116, 146, 73/146.2–146.8; 701/29.1, 1
See application file for complete search history.

(56) References Cited

U.S. PATENT DOCUMENTS

| 5,541,573 | A | * | 7/1996 | Jones ............................ 340/444 |
| 5,940,781 | A | | 8/1999 | Nakajima |
| 6,323,765 | B1 | | 11/2001 | Horie et al. |
| 8,726,724 | B2 | * | 5/2014 | Oshiro et al. .................... 73/146 |
| 2004/0064219 | A1 | * | 4/2004 | Mancosu et al. .................. 701/1 |
| 2010/0013616 | A1 | * | 1/2010 | Fujita et al. .................... 340/443 |

(Continued)

FOREIGN PATENT DOCUMENTS

| JP | 4-345224 A | 12/1992 |
| JP | 10-250324 A | 9/1998 |

(Continued)

OTHER PUBLICATIONS

Japanese Office Action for Japanese Application No. 2012-126717 dated Mar. 11, 2014.

*Primary Examiner* — Hoi Lau
(74) *Attorney, Agent, or Firm* — Birch, Stewart, Kolasch & Birch, LLP

(57) ABSTRACT

A wrong operation detection device is disclosed for monitoring whether or not a calibration start for determining an initial deflation index is issued in a tire pressure unadjusted state after a deflation warning in a tire pressure monitoring system for detection of deflation of a tire. The device includes comparison means for comparing a first deflation index serving as a deflation index at any time point in a period from issue of the deflation warning to vehicle stop after the issue of the warning, with a second deflation index serving as a deflation index obtained after the calibration start; detection means for detection of wrong operation of a reset button based on a comparison result by the comparison means; and warning means for issuing a warning when the detection means detects the wrong operation.

7 Claims, 3 Drawing Sheets

1: WHEEL SPEED SENSOR
2: CONTROL UNIT
3: DISPLAY
4: RESET BUTTON
5: WARNING LAMP

(56) References Cited

U.S. PATENT DOCUMENTS

| | | | |
|---|---|---|---|
| 2010/0013617 A1* | 1/2010 | Fujita et al. | 340/443 |
| 2010/0217542 A1* | 8/2010 | Fujita et al. | 702/50 |
| 2011/0107828 A1* | 5/2011 | Kawasaki | 73/146.2 |
| 2012/0245787 A1* | 9/2012 | Kawasaki | 701/29.1 |
| 2012/0304754 A1* | 12/2012 | Oshiro et al. | 73/146 |
| 2013/0321138 A1* | 12/2013 | Sakagami et al. | 340/442 |

FOREIGN PATENT DOCUMENTS

| | | |
|---|---|---|
| JP | 11-59148 A | 3/1999 |
| JP | 2005-53263 A | 3/2005 |
| JP | 2009-274639 A | 11/2009 |

* cited by examiner

1: WHEEL SPEED SENSOR
2: CONTROL UNIT
3: DISPLAY
4: RESET BUTTON
5: WARNING LAMP

WRONG OPERATION DETECTION DEVICE, METHOD, AND PROGRAM IN TIRE PRESSURE MONITORING SYSTEM

TECHNICAL FIELD

The present invention relates to a wrong operation detection device, a method, and a program in a tire pressure monitoring system. Further in detail, the present invention relates to a wrong operation detection device, a method, and a program for detection of whether the calibration is performed without any tire pressure adjustment after warning in a tire pressure monitoring system.

BACKGROUND ART

One of factors for letting an automobile safely travel includes pressure of tires. When the pressure is decreased to less than a proper value, driving stability and fuel consumption are deteriorated, so that a tire burst may sometimes be caused. Therefore, a tire pressure monitoring system (TPMS) for detecting a decrease in tire pressure and issuing a warning so as to urge a driver to take a proper action is an important technique from a view of protecting an environment and ensuring safety of the driver.

The conventional monitoring system can be classified into two types including a direct detection type and an indirect detection type. The direct detection type is to directly measure the pressure of the tire by an incorporating pressure sensor inside a tire wheel. Although the decrease in the pressure can be detected with high precision, some disadvantages in terms of technique and cost remain including a need for a dedicated wheel and a problem in fault tolerance in an actual environment.

Meanwhile, the indirect detection type is a method for estimating a deflated state from rotation information of the tire, and can further be classified into a DLR (Dynamic Loaded Radius) method and a RFM (Resonance Frequency Method) method. The DLR method is a method for utilizing a phenomenon that a dynamic loaded radius is decreased due to crush of a deflated tire during traveling and as a result the tire is rotated more quickly than a tire of normal pressure, and comparing rotation speed of four tires so as to detect the decrease in the pressure (for example, refer to Patent Literature 1). Since calculation processing is relatively easily performed with using only rotation speed signals of wheels obtained from wheel speed sensors, the DLR method has been widely studied for a purpose of mainly detecting a puncture of one wheel. On the other hand, the RFM method is a method for utilizing a change in a frequency characteristic of wheel speed signals due to deflation so as to detect a difference from normal pressure (for example, refer to Patent Literature 2). Due to absolute comparison with preliminarily held normal values of wheels, the RFM method is drawing attention as an indirect detection method capable of detecting simultaneous deflation of four wheels unlike the DLR method.

CITATION LIST

Patent Literature

Patent Literature 1: Japanese Unexamined Patent Publication No. 2005-53263
Patent Literature 2: Japanese Unexamined Patent Publication No. 2009-274639

SUMMARY OF INVENTION

Technical Problem

In the DLR method and the RFM method described above, the deflation is detected by comparison with an index based on the rotation speed information of the tire at normal pressure or a resonance frequency similarly at the normal pressure. Thus, there is a need for performing the calibration after making the pressure of the tire the normal pressure, studying the index based on the rotation speed information of the tire or the resonance frequency at the normal pressure, and storing the obtained index and the like.

In the conventional tire pressure monitoring system, when a calibration start command is issued by operation of a reset button for example, the system executes the calibration following a predetermined procedure.

When the tire pressure monitoring system issues a deflation warning during traveling, the driver normally adjusts the pressure of the tire to the normal pressure in a service station or the like and then performs the calibration. However, there is sometimes a case where the reset button is pressed without adjusting the pressure, so that a warning light notifying the driver of the deflation is turned off. In a case of the indirect detection type of tire pressure monitoring system described above, an absolute value of the tire pressure cannot be detected. Thus, the system starts the calibration in a deflation condition and studies the index or the resonance frequency in a deflation condition. As a result, there is a possibility that a prescribed deflation condition cannot be detected.

The present invention has been made in view of the above circumstances, and an objective thereof is to provide a wrong operation detection device, a method, and a program in a tire pressure monitoring system, capable of judging whether or not calibration is performed without adjusting pressure of a tire after a warning.

Solution to Problem (1) A wrong operation detection device in a tire pressure monitoring system of the present invention (hereinafter, also simply referred to as the "wrong operation detection device") is a wrong operation detection device for monitoring whether or not a calibration start for determining an initial deflation index is issued in a tire pressure unadjusted state after a deflation warning in a tire pressure monitoring system for detection of deflation of a tire by comparison with the initial deflation index based on rotation speed information and/or a resonance frequency after adjusting pressure of the tire equipped on a vehicle, the wrong operation detection device including:

comparison means for comparing a first deflation index serving as a deflation index at any time point in a period from issue of the deflation warning to vehicle stop after the issue of the warning, with a second deflation index serving as a deflation index obtained after the calibration start, detection means for detection of wrong operation of a reset button based on a comparison result by the comparison means, and warning means for issuing a warning when the detection means detects the wrong operation.

In the wrong operation detection device of the present invention, in a case where the calibration start is issued by pushing a reset button by a driver for example after the deflation warning, the second deflation index is determined, and this second deflation index is compared with the first deflation index serving as the deflation index at any time point in the period from the issue of the deflation warning to the vehicle stop after the issue of the warning by the comparison means. Based on the comparison result thereof, the detection means detects the wrong operation of a reset button. In a case where the wrong operation is detected, the warning means issues the warning. Thereby, the driver can understand that the driver operated the reset button without adjusting the pressure of the tire and started calibration by mistake.

It should be noted that the "wrong operation" in the present description indicates "the calibration is started by pushing the reset button or the like without adjusting the pressure of the deflated tire to normal pressure after the deflation warning by the tire pressure monitoring system". Such wrong operation is not only caused by carelessness or mistake that the driver forgets pressure adjustment of some tires and the like but also includes a case where the driver intentionally executes the calibration in order to eliminate a warning lamp.

(2) In the wrong operation detection device of (1) described above, the comparison means may determine a difference between the first deflation index and the second deflation index, and the detection means may detect wrong operation when the difference is within a predetermined range.

(3) In the wrong operation detection device of (1) or (2) described above, the wrong operation detection device may further include count means for counting the number of the wrong operation, and the warning means may stop to warn when the number of the wrong operation by the count means exceeds the predetermined number.

(4) A wrong operation detection method in a tire pressure monitoring system of the present invention (hereinafter, also simply referred to as the "wrong operation detection method") is a wrong operation detection method for monitoring whether or not a calibration start for determining an initial deflation index is issued in a tire pressure unadjusted state after a deflation warning in a tire pressure monitoring system for detection of deflation of a tire by comparison with the initial deflation index based on rotation speed information and/or a resonance frequency after adjusting pressure of the tire equipped on a vehicle, the wrong operation detection method including:

a comparison step for comparing a first deflation index serving as a deflation index at any time point in a period from issue of the deflation warning to vehicle stop after the issue of the warning with a second deflation index serving as a deflation index obtained after the calibration start, a detection step for detecting wrong operation based on a comparison result in the comparison step, and a warning step for issuing a warning when the wrong operation is detected in the detection step.

(5) In the wrong operation detection method of (4) described above, the comparison step may be to determine a difference between the first deflation index and the second deflation index, and the detection step may be to detect wrong operation when the difference is within a predetermined range.

(6) In the wrong operation detection method of (4) or (5) described above, the wrong operation detection method may further include a count step for counting the number of the wrong operation, and the warning step may stop to warn when the number of the wrong operation in the count step exceeds the predetermined number.

(7) A wrong operation detection program in a tire pressure monitoring system of the present invention (hereinafter, also simply referred to as the "wrong operation detection program"), in order to monitor whether or not a calibration start for determining an initial deflation index is issued in a tire pressure unadjusted state after a deflation warning in a tire pressure monitoring system for detection of deflation of a tire by comparison with the initial deflation index based on rotation speed information and/or a resonance frequency after adjusting pressure of the tire equipped on a vehicle, makes a computer function as comparison means for comparing a first deflation index serving as a deflation index at any time point in a period from issue of the deflation warning to vehicle stop after the issue of the warning, with a second deflation index serving as a deflation index obtained after the calibration start, and detection means for detection of wrong operation based on a comparison result.

Advantageous Effects of Invention

According to the wrong operation detection device, the method, and the program of the present invention, whether or not the calibration is performed without adjusting the pressure of the tire after the tire pressure warning can be detected.

DESCRIPTION OF EMBODIMENTS

Figure 1:
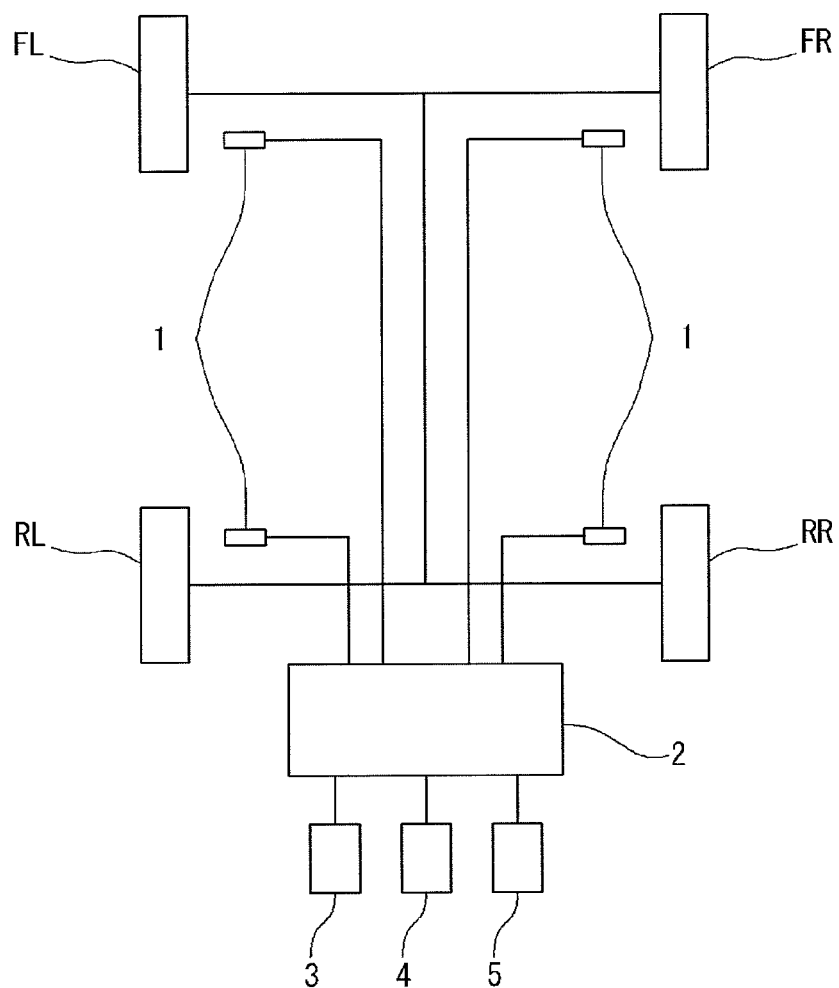
FIG. 1 is a block diagram showing one example of a tire pressure monitoring system provided with a wrong operation detection device of the present invention.

Hereinafter, with reference to the attached drawings, an embodiment of a wrong operation detection device, a method, and a program of the present invention will be described in detail. FIG. 1 is a block diagram showing one example of a tire pressure monitoring system provided with the wrong operation detection device of the present invention, and FIG. 2 is a block diagram showing an electric configuration of the tire pressure monitoring system shown in FIG. 1.

As shown in FIG. 1, the tire pressure monitoring system is provided with normal wheel speed sensors 1 provided in relation to tires in order to detect rotation speed information of a left front wheel (FL), a right front wheel (FR), a left rear wheel (RL), a right rear wheel (RR) of four tires provided in a four-wheeled vehicle.

As the wheel speed sensors 1, there can be used a wheel speed sensor for generating a rotation pulse with using an electromagnetic pickup or the like so as to measure rotation angular velocity and wheel speed from the number of the pulse, an angular velocity sensor including a sensor for generating electric power with utilizing rotation like a dynamo so as to measure the rotation angular velocity and the wheel speed from voltage thereof, or the like. An output of the wheel speed sensors 1 is given to a control unit 2 serving as a computer such as an ABS. Connected to this control unit 2 are a display 3 comprising a liquid crystal display element, a plasma display element, a CRT, or the like for displaying the tires of which inner pressure is decreased; a reset button or switch 4 capable of being operated by a driver to obtain an initial deflation index from calibration; and a warning lamp 5 for notifying the driver of a decrease in the inner pressure of the tires and wrong operation described later.

Figure 2:
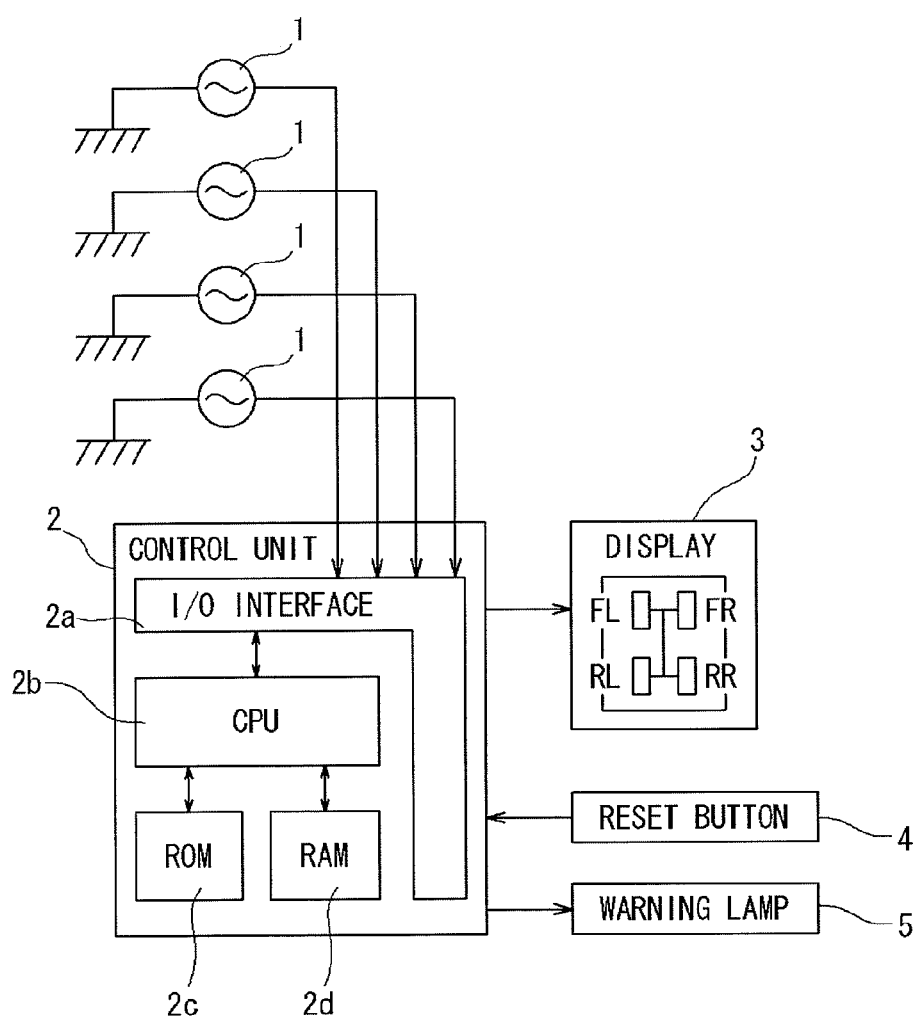
FIG. 2 is a block diagram showing an electric configuration of the tire pressure monitoring system shown in FIG. 1.
Figure 3A:
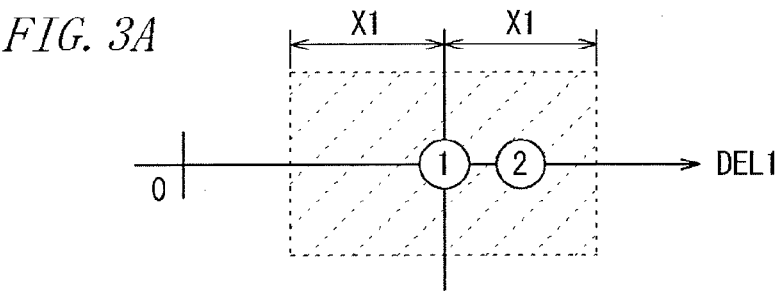
FIGS. 3A-3D are diagrams for illustrating wrong operation detection with using a plurality of deflation indexes.
Figure 3B:
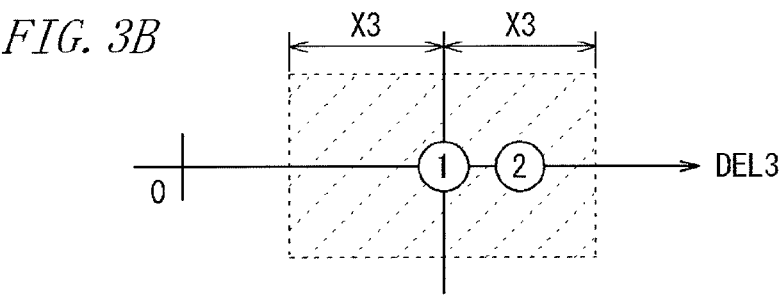
Figure 3C:
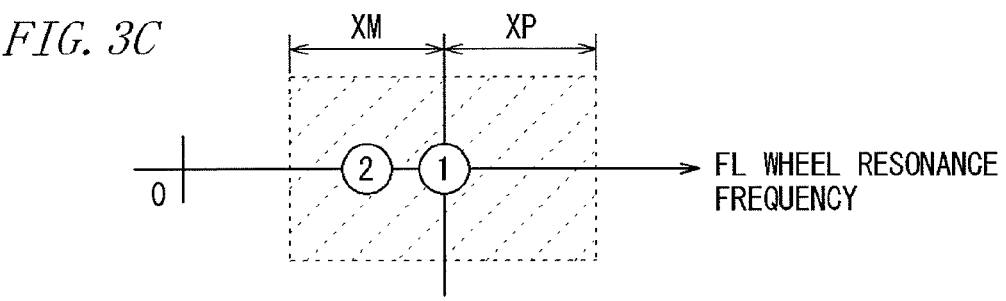
Figure 3D:
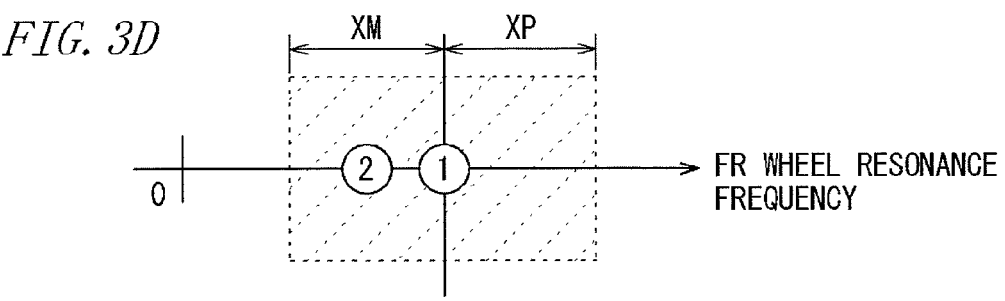

As shown in FIG. 2, the control unit 2 comprises an I/O interface 2a required for sending and receiving signals to and from an external device, a CPU 2b functioning as a center of arithmetic processing, a ROM 2c in which a control operation program of this CPU 2b is stored, and a RAM 2d in which data and the like are temporarily written and the written data is read out when the CPU 2b performs control operation.

In the wheel speed sensors 1, a pulse signal corresponding to the rotation number of the tire (hereinafter, also referred to as the "wheel speed pulse") is outputted. In the CPU 2b, based on the wheel speed pulse outputted from the wheel speed sensors 1, rotation angular velocity Fi serving as rotation speed information of the tire is calculated for each predetermined sampling cycle $\Delta T$ (sec), for example, for $\Delta T=0.04$ seconds. The wheel speed can be determined with using this rotation angular velocity Fi.

Further, with using the wheel speed of the vehicle, deflation index in the DLR method described above can be determined. As the deflation index, three kinds of index DEL1, DEL 2, and DEL3 can be used. Here, DEL1 is a comparative value between the wheel speed of the two wheels on diagonal and other, DEL2 is a comparative value between the wheel speed of the front wheels and the rear wheels, and DEL3 is a comparative value between the wheel speed of the right wheels and left wheels. For example, indexes shown by the following expression (1) can be used.

$$DEL1=[\{(F1+F4)/(F2+F3)\}-1]\times 100(\%)$$

$$DEL2=[\{(F1+F2)/(F3+F4)\}-1]\times 100(\%)$$

$$DEL3=[\{(F1+F3)/(F2+F4)\}-1]\times 100(\%) \quad (1)$$

F1 to F4 denote the wheel speed of the left front wheel, the right front wheel, the left rear wheel, and the right rear wheel, respectively.

The resonance frequency in the RFM method described above can be obtained by a general method. For example, a second-order linear predictive model is introduced to a time-series signal (wheel speed signal) including a vibration component of the tire, a parameter of the linear predictive model is identified so as to calculate the resonance frequency of the tire, and further, an influence amount of an external factor influencing the calculated resonance frequency is extracted and the resonance frequency is corrected in accordance with the influence amount of this external factor, so that the resonance frequency can be determined (refer to Japanese Patent No. 3152151). The resonance frequency can also be estimated by performing a frequency analysis on the time-series signal including the vibration component of the tire by processing such as the Fourier transform.

In the wrong operation detection device according to the present embodiment, in a case where after deflation of the tire is detected by the deflation indexes of DEL1 to DEL3 and the deflation indexes of the resonance frequency and the warning is issued to the driver by the warning lamp 5, the driver operates the reset button 4 and gives a calibration start to the control unit 2 without adjusting the pressure of the deflated tire to normal pressure, whether it is wrong operation or not is detected. In more detail, when the calibration start is given, in parallel to normal calibration of determining the initial deflation index, a deflation index in a stage that the calibration start is given (second deflation index) is calculated. Next, this second deflation index is compared with the first deflation index serving as a deflation index at any time point in a period from issue of the deflation warning to vehicle stop after the issue of the warning, and based on this comparison result, whether it is the wrong operation or not is detected. When it is detected to be the wrong operation, the warning lamp 5 serving as warning means issues the warning. The first deflation index can be a deflation index when the deflation warning is issued. However, from a point of increasing detection precision of the wrong operation, the first deflation index is desirably a deflation index immediately before the vehicle stop after warning.

It should be noted that whether or not the tire is deflated can be detected by comparing the deflation index obtained by calibration with the tire already adjusted to the normal pressure (initial deflation index) and the deflation index obtained at the time of traveling. Specifically, in a case where a difference or a ratio between both the indexes exceeds a predetermined range, it can be detected that the tire is deflated.

The wrong operation detection device according to the present embodiment is provided in a tire pressure monitoring system, and comprises: comparison means for comparing the first deflation index serving as the deflation index at any time point in the period from the issue of the deflation warning to the vehicle stop after warning with the second deflation index serving as the deflation index obtained after the calibration start; detection means for detection of wrong operation of a reset button based on a comparison result by the comparison means; and warning means for issuing a warning when the detection means detects the wrong operation. It should be noted that the warning means can be a warning unit different from the warning lamp 5 for the deflation warning.

A wrong operation detection program according to the present embodiment is installed in the control unit 2, so as to make the control unit 2 function as the comparison means and the detection means.

Whether it is the wrong operation or not can be detected by whether or not the difference or the ratio between the first deflation index and the second deflation index is within a predetermined range. The wrong operation may be detected only by one kind of deflation index such as DEL1, or the wrong operation may be detected with using two or more kinds of deflation indexes (for example, four kinds including DEL1, DEL3, the resonance frequency of the left front wheel, and the resonance frequency of the right front wheel).

FIGS. 3(A) to 3(D) are illustrative views of wrong operation detection with using four kinds of deflation indexes (DEL1, DEL3, the resonance frequency of the left front wheel, and the resonance frequency of the right front wheel). In FIG. 3, horizontal axes of four graphs are DEL1, DEL3, the resonance frequency of the left front wheel, and the resonance frequency of the right front wheel from the upper side. Further, the circled numeral "1" indicates the first deflation index serving as the deflation index when the deflation warning is issued, and the circled numeral "2" indicates the second deflation index serving as the deflation index obtained after the calibration start.

Further in FIG. 3, regions indicated by hatching of broken lines are wrong operation detection regions. In the present embodiment, in a case where all the four second deflation indexes are in the regions, the wrong operation is judged. X1, X3, XM, and XP defining the wrong operation detection regions can preliminarily be determined by experimental travel or the like and stored in the ROM 2c of the control unit 2. It should be noted that in FIG. 3, for easy understanding, positions of the four first deflation indexes in the horizontal axes and size of the four wrong operation detection regions are the same. However, values or size thereof are different from each other in reality.

Specific examples of X1, X3, XM, and XP are, for example, X1=0.02 (corresponding to 20% of a 25% deflation threshold value for one wheel), X3=0.01 (corresponding to 10% of the 25% deflation threshold value for one wheel), XM=XP=0.5 (corresponding to 25% of the 25% deflation threshold value for one wheel).

EXAMPLES

Next, an example of a wrong operation detection method of the present invention will be described. The present invention is not limited only to such an example as a matter of course.

Example

With using a test vehicle provided with a tire pressure monitoring system in which a wrong operation detection program is installed, experimental travel was performed in a test route. After the vehicle traveled in a state that tires of all four wheels were 25% deflated and the tire pressure monitoring system issued a deflation warning, an reset button was pressed without adjusting pressure of the tires in a deflated state, and the vehicle continued to travel at 80 kph. Then, in 12 minutes after the reset button was pressed, the wrong operation was detected. After that, further, the reset button was pressed again without adjusting the pressure, and the vehicle continued to travel at 50 kph. Then, in 8 minutes after the reset button was pressed, the wrong operation was detected.

Comparative Example

With using a test vehicle provided with a tire pressure monitoring system in which a program for only executing normal calibration after a calibration start is installed, experimental travel was performed in the test course. After the vehicle traveled in a state that tires of all four wheels were 25% deflated and the tire pressure monitoring system issued a deflation warning, a reset button was pressed without adjusting pressure of the tires in a deflated state, and the vehicle continued to travel at 80 kph. However, although the tires are in a deflated state, no deflation warning was issued.

REFERENCE SIGNS LIST

1: WHEEL SPEED SENSOR
2: CONTROL UNIT
2a: INTERFACE
2b: CPU
2c: ROM
2d: RAM
3: DISPLAY
4: RESET BUTTON
5: WARNING LAMP

What is claimed is:

1. A wrong operation detection device for monitoring whether or not a calibration start for determining an initial deflation index is issued in a tire pressure unadjusted state after a deflation warning in a tire pressure monitoring system for detection of deflation of a tire by comparison with the initial deflation index based on rotation speed information and/or a resonance frequency after adjusting pressure of the tire equipped on a vehicle, the wrong operation detection device comprising:
comparison means for comparing a first deflation index serving as a deflation index at any time point in a period from issue of the deflation warning to vehicle stop after the issue of the warning, with a second deflation index serving as a deflation index obtained after the calibration start,
detection means for detection of wrong operation of a reset button based on a comparison result by the comparison means, and
warning means for issuing a warning when the detection means detects the wrong operation.

2. The wrong operation detection device according to claim 1, wherein the comparison means determines a difference between the first deflation index and the second deflation index, and
the detection means detects wrong operation when the difference is within a predetermined range.

3. The wrong operation detection device according to claim 1 or claim 2, further comprising count means for counting the number of the wrong operation and wherein the warning means stops to warn when the number of the wrong operation by the count means exceeds the predetermined number.

4. A wrong operation detection method for monitoring whether or not a calibration start for determining an initial deflation index is issued in a tire pressure unadjusted state after a deflation warning in a tire pressure monitoring system for detection of deflation of a tire by comparison with the initial deflation index based on rotation speed information and/or a resonance frequency after adjusting pressure of the tire equipped on a vehicle, the wrong operation detection method including:
a comparison step for comparing a first deflation index serving as a deflation index at any time point in a period from issue of the deflation warning to vehicle stop after the issue of the warning with a second deflation index serving as a deflation index obtained after the calibration start,
a detection step for detecting wrong operation based on a comparison result in the comparison step, and
a warning step for issuing a warning when the wrong operation is detected in the detection step.

5. The wrong operation detection method according to claim 4, wherein the comparison step determines a difference between the first deflation index and the second deflation index, and
the detection step detects wrong operation when the difference is within a predetermined range.

6. The wrong operation detection method according to claim 4 or claim 5, further including a count step for counting the number of the wrong operation, and wherein the warning step stops to warn when the number of the wrong operation in the count step exceeds the predetermined number.

7. A wrong operation detection program in a tire pressure monitoring system which, in order to monitor whether or not a calibration start for determining an initial deflation index is issued in a tire pressure unadjusted state after a deflation warning in a tire pressure monitoring system for detection of deflation of a tire by comparison with the initial deflation index based on rotation speed info nation and/or a resonance frequency after adjusting pressure of the tire equipped on a vehicle, makes a computer function as
comparison means for comparing a first deflation index serving as a deflation index at any time point in a period from issue of the deflation warning to vehicle stop after the issue of the warning, with a second deflation index serving as a deflation index obtained after the calibration start, and
detection means for detection of wrong operation based on a comparison result.

* * * * *